United States Patent
Ueda et al.

[11] 3,799,662
[45] Mar. 26, 1974

[54] IMAGE PROJECTING DEVICE

[75] Inventors: Hiroyuki Ueda; Shingo Ohue; Yukio Sawano, all of Asaka, Japan

[73] Assignee: Fuji Photo Film Co., Ltd., Minami Ashigara-shi, Kanagawa, Japan

[22] Filed: Nov. 6, 1970

[21] Appl. No.: 87,555

[30] Foreign Application Priority Data
Nov. 6, 1969  Japan.............................. 44-88890
Nov. 10, 1969  Japan.............................. 44-89929
Nov. 13, 1969  Japan.............................. 44-90896

[52] U.S. Cl.................................. 353/23, 353/27
[51] Int. Cl....................... G03b 21/11, G03b 1/52
[58] Field of Search............ 353/22, 23, 24, 25, 26, 353/27, 122; 269/21

[56] References Cited
UNITED STATES PATENTS
3,267,801  8/1966  Abbott............................... 353/75
3,273,450  9/1966  Ede..................................... 353/26
2,914,289  11/1959  Schutt................................ 269/21

Primary Examiner—Louis R. Prince
Assistant Examiner—A. J. Mirabito
Attorney, Agent, or Firm—Sughrue, Rothwell, Mion, Zinn & Macpeak

[57] ABSTRACT

Apparatus for projecting images of a film onto a screen through a projection lens system, comprising a film support having perforations, a pump for applying a suction to the perforations to draw the film into contact with the support, a nozzle disposed on the side of the film opposite to the support for blowing air onto the film to urge it toward the support, and a valve for controlling the suction and air flow to the support perforations and the nozzle.

18 Claims, 4 Drawing Figures

IMAGE PROJECTING DEVICE

BACKGROUND OF THE INVENTION

This invention relates to a device for projecting images onto a screen, and in particular to a device for projecting a microfilm image onto a screen in an enlarged scale in which the movement of the film can be easily accomplished.

This invention is applicable to a micro image projector or microreader in which a number of pages of a book, such as a dictionary or the like, are recorded on a microfilm and projected in an enlarged scale onto a projection screen. Particularly, the device of this invention is suitable for projecting a microimage reduced in size to under 1/100 of the original.

The photographic microimage recorded on the microfilm used in the embodiment of the projecting device in accordance with the present invention is recorded on a microfilm having resolution of about 2000 lines/mm. The size of the sheet formed microfilm is 4 in. × 6 in. and the image is recorded on the microfilm with the use of a lens having a resolving power of higher than 1000 lines/mm.

In the case of recording a document of the size A4 with 1/100 reduction rate on a microfilm of 4 in. × 6 in. size, about 1200 pages can be easily recorded with large spaces between the image frames thereon. The resolution finally obtained on the recorded microfilm becomes about 800 lines/mm. The microimage thus recorded on a film can be best read when enlarged with 100 times magnification. It will be readily understood that a sufficiently brighter light source and a projecting optical system having a sufficiently high resolving power are required.

In order to project the image clearly and sharply on the screen, the projection lens employed in the projecting optical system should have as strong resolving power as that of the lens for recording the microimage. In the case where the page of the book and the like of A4 size is recorded on a film with the reduction ration of 1/100, the size of the image of the page on the microfilm becomes about 2 × 3 mm. If the image of the page is projected on the screen fully thereon, the sufficiently high resolving power of the projection lens is needed for a projection angle of about 8°. Furthermore, the film itself is required to have sufficiently good flatness over the area of the one frame of the image, that is, the page image of 2 × 3mm size.

In the projection device as described above, it is often required to change the projection image from one to another so as to read the article in the page continuously from one page to the next. In such a case, it is required that the film be accurately maintained on the focal plane even when the position of the film is slightly moved. Otherwise, it is cumbersome to make a focus adjustment for each frame every time the image of the page is changed from one to another, which results in an unnecessary waste of time and labor.

Generally, it is said that the brightness required to read the letters on the screen in a room without becoming tired is about 100 lux. Since the transmittivity of a screen of good quality is about 10 percent, a light source making about 1000 lux illumination is required on the back side of the screen so as to make 100 lux on the outside of the screen. Further, since the image is recorded on the film in reduced scale, the intensity of the light on the film is much larger. In order to make 100 lux illumination on the screen in case of projecting the image in the enlarged scale with 100 times magnification, 10,000,000 lux is required on the film surface, which instantaneously burns the film without any cooling means.

As described above, it is required in a projecting device which projects images with high magnification as large as 100 times that the microfilm bearing microimage thereon should be held in good flatness on the focal plane throughout the whole image unit on the film and the microfilm should be protected against the heat generated from the light source of high intensity.

It has been known in the art, in order to solve the above-mentioned problems in projecting a microimage on a screen with sufficient brightness, to provide a flat glass of 4 × 6 in. size having grooves in the device at the position where the film supported thereon by a vacuum or pressure differential is on the focal plane of the projection optical system. This glass plate supports the film of 4 × 6 in. size thereon and serves as the position determining means and as a heat transmitting means. That is, the heat applied on the film can be transmitted through the glass and the film is prevented from being burnt. And it has been known in the art to provide a means for intercepting the light from the light source in the event that the film is separated from the supporting glass in order to prevent the film from being burnt by the heat from the light source.

Such devices employed in the conventional projecting device as described above, however, have been disadvantageous in that the surface of the glass plate must be processed to have complete flatness over the whole area of 4 × 6 in. to hold the variation in thickness of the film and displacement of the film moving mechanism from the standard position in the direction of the optical axis of the projection system within the focal depth of the projection lens system. Such a process is very difficult owing to the degree of accuracy required. Otherwise, there must be provided a means for controlling or regulating the position of the surface of the film supporting glass plate at the right position. In the case that the glass plate position controlling means is provided in the projecting device, there also must be provided a driving means having a large torque to move the film supporting construction with the glass plate position controlling means of great weight. In order to increase the moving speed of the film, the driving means is required to have a large torque, which is disadvantageous economically.

SUMMARY OF THE INVENTION

The primary object of the invention is to provide an image projecting device in which the film is moved to select the portion of the image to be projected with a light mechanism.

Another object of the present invention is to provide a simple construction for projecting the microfilm image in which the heat is effectively released and the flatness of the film is effectively maintained.

BRIEF DESCRIPTION OF THE DRAWINGS

Other objects, features and advantages of the present invention will be fully understood from the following description of the preferred embodiment of the invention taken in conjunction with the accompanying drawing in which.

DESCRIPTION OF THE PREFERRED EMBODIMENT

Figure 1:
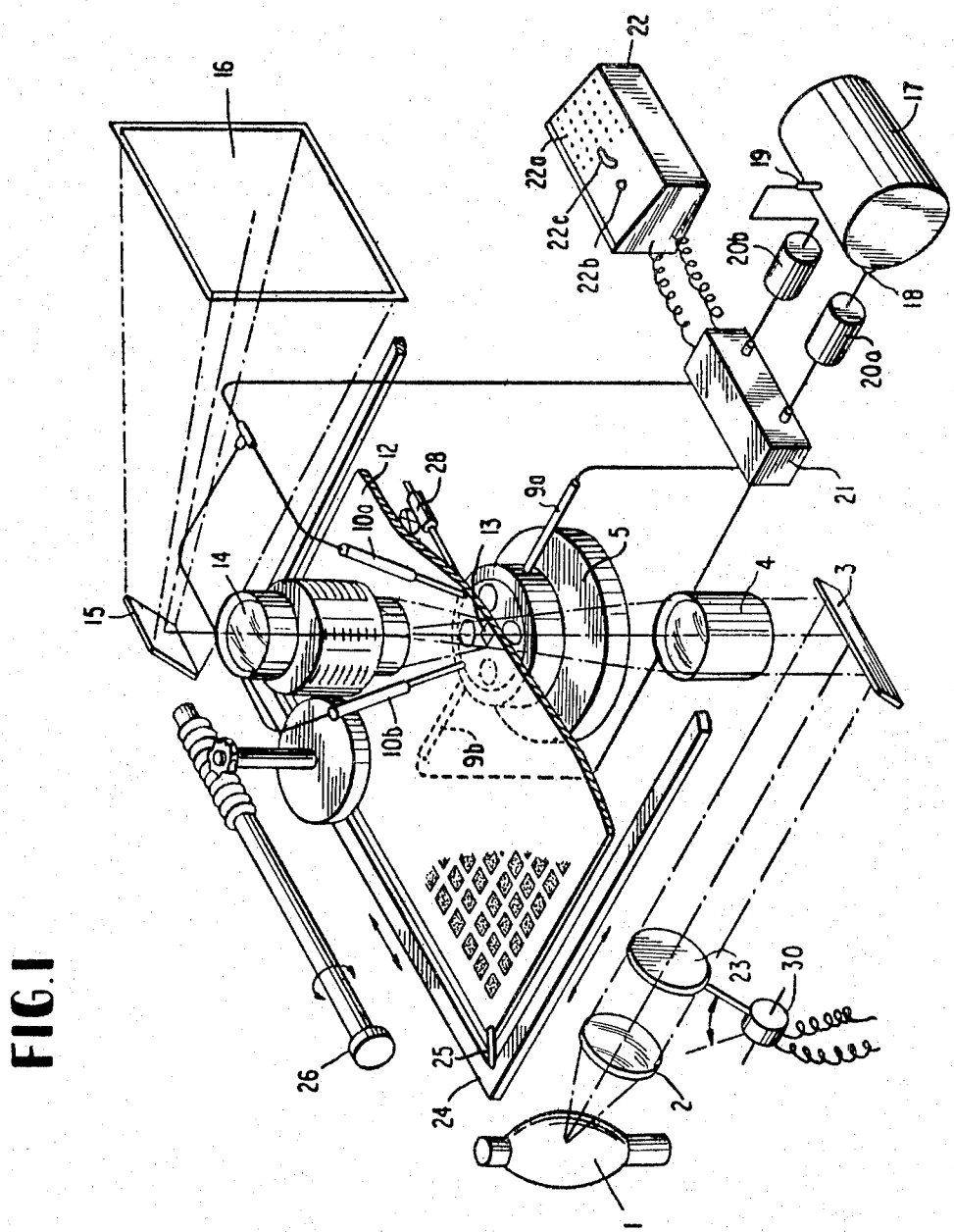
FIG. 1 is an exploded perspective view, with parts broken away, of a device for projecting images in accordance with the present invention.

Referring to FIG. 1, the light rays projected from the light source 1 illuminate an image 13, and the image 13 is projected onto a projection screen 16 through a projection lens system 14. The microfilm 12 is supported by a metal frame 24 by the use of a spring clip 25 of any suitable type. The metal frame 24 is movable in a horizontal plane to change the images to be projected. The film 12 is brought into contact with the glass plate 7 (See FIG. 2) by suction applied through a suction holder 5 to cause the area of the film bearing the image to be projected flat on the focal plane. Blowing nozzles 10a and 10b are provided above the film supporting station so as to urge the film into good contact with the surface of flat glass plate 7 on the suction holder 5. The nozzles 10a and 10b are connected with a vacuum pump 17 through a distributor 21. A controlling means (not shown) of any suitable type may be provided for controlling the above projection optical system, the film moving system, and the suction system in synchronization with each other.

The optical system of the present invention will now be described in detail, referring to FIG. 1. The light source 1 preferably is a super-high pressure mercury lamp of 300W and is provided with an elliptical mirror to effectively utilize the electric power and the light. Such a light source is the most effective one of the conventional light sources which have high intensity of light and low heat characteristics. The light emitted from the light source 1 is guided to the film 13 through a condenser lens 2 located at the position spaced a focal length from the light source to make the light rays parallel, a shutter 23 which intercepts the light rays selectively and is connected with a rotary solenoid switch 30, a cold mirror 3, and a condenser lens 4. The cold mirror 3 may be of any suitable construction, and preferably is a mirror which is provided with a plurality of layers evaporated on a glass and has high reflectance for the visible light rays and high transmittivity for the heat rays.

The light rays condensed by the condenser lens 4 illuminate the image 13 of the microfilm 12 which is in contact with the suction holder 5. This image 13 is projected onto the projection screen 16 in large scale through the projection lens system 14 by way of the mirror 15. In the embodiment of the device shown in FIG. 1, the projection lens system 14 preferably has a focal length of 13mm and F-number of 1.5, and a resolving power of 800 lines/mm. The chromatic abberation is removed over the whole visible light range. Further, the projection lens barrel is provided with a helicoid for fine adjustment of about 0.5 of focal length by a knob 26. The mirror 15 preferably is made of an optical flat of approximately 10mm thickness which is coated with aluminum on the surface thereof. The screen 16 is disposed at a position 1300mm spaced from the principal plane of the projection lens 14 and the image is projected thereon with magnification of 100 times.

The microfilm and the means for moving the film will now be described in detail, referring again to FIG. 1. The mircofilm preferably is of the size of 4 × 6 in. standardized by the Microphotography Committee and is made of PET (Polyethylene-terephthalate) base coated with a superfine particle emulsion layer including fine emulsion particles of 4 to 6 particle size. The images are recorded on the microfilm in reduced scale by a lens system having high resolving power and the microfilm with the recorded images is used for making work film by duplication with the use of a vacuum contact printer.

The image on the work film is a positive image, which is easy to read. The work film has a marginal portion on the all sides thereof of about 10mm wide to provide a bland margin for holding it by fingers, and within the marginal area thereof are recorded 1200 frames of the size of 2 × 3 mm in 40 lines and 30 rows. Though the image bearing film may be made of glass plate, it is preferred that the base of the work film be a plastic film in view of handling and storing convenience.

The film is supported by a rectangular metal frame 24 by means of clips 25 and is made to be separated from the suction holder 5 about 2.5mm thereabove when the film image is not in the projection condition.

The metal frame 24 preferably is connected with wires (not shown) and supported on a set of rails (not shown) having rolls and bearings thereon. The wires are made to be pulled by a servo motor employing a pulley on which the wire is wound. Such driving means is provided for moving the film back and forth, and left and right. The driving means is provided with signals for controlling the position of the film with respect to the optical path of the projection system.

The film driving means is provided with two kinds of signals, one of which is for moving the film back and forth and the other of which is for moving film left and right. Both signals are fed into a pair of servo motors (not shown) respectively through amplifiers so as to move the film to the desired position with respect to the optical projection system.

The vacuum system of the device for holding the film 12 on the support glass 7 in response to the signal provided thereto will now be described in detail, referring to FIGS. 1 and 2. The reference numeral 17 indicates a rotary vacuum pump for drawing air through the suction hole 18 thereof and for discharging air through the discharging hole 19 thereof. A filter 20a containing a suitable drying agent is provided in the passage connected with the inlet or suction hole 18, and a filter 20b containing a suitable filtering element for filtering oil and dust is provided in the passage connected with the outlet or discharging hole 19. A distributor 21 is provided with a pair of electromagnetic valves 29a, 29b or the like which are connected with the suction holder 5 and a pair of blowing nozzles 10a and 10b.

Figure 2:
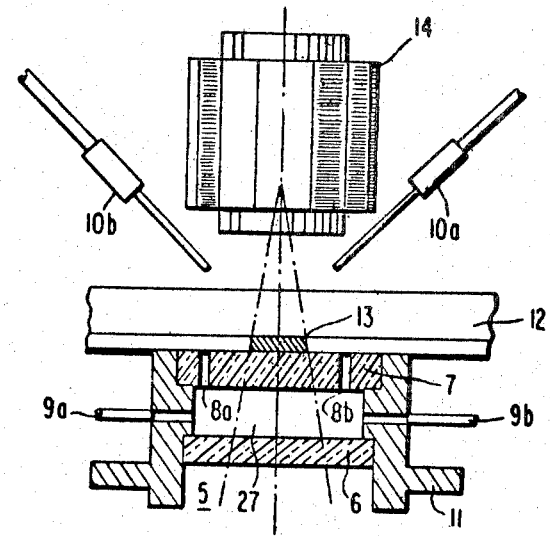
FIG. 2 is a vertical sectional view of the main portion of the device shown in FIG. 1.

In FIG. 2, the suction holder 5 and the blowing nozzles 10a and 10b are shown in detail. The suction holder 5 comprises a cylindrical metal support 11 with a flange, a heat shielding glass 6 of about 2mm thick secured to the metal support 11, and a non-glare glass 7 having four perforations 8a, 8b, 8c and 8d. An air-tight chamber 27 formed between the two glasses 6 and 7 is connected with the suction lines 9a and 9b and a leak valve 28. The non-glare glass 7 is made from an optical glass having good flatness. The optical glass 7 is corrosion processed on the surface thereof to make a rough surface of about 100 mesh roughness. Such a non-glare glass is well known in the field of meters and television as a panel glass for the meter and as a protective glass in front of the television receiver used for the purpose of reducing undesirable glare.

The operation and the effect of the vacuum system will now be described in detail. The vacuum pump 17 is normally operated to draw air through the inlet 18 and to discharge air through the outlet 19. When the frames are moved into the optical path of the projection system and stop at the position in alignment with the optical path, the signal of stopping is transmitted thereinto and the electromagnetic valves (not shown) in the distributor 21 are operated in any suitable manner to remove the air in the chamber 27 bewteen the glass plates 6 and 7. At the same time, the electromagnetic valve operates to connect the discharging outlet 19 of the rotary pump 17 with the nozzles 10a and 10b. Thus, the air from the rotary pump 17 is sent to the nozzles 10a and 10b through the filter 20b and distributor 21.

The image frame 13 of the microfilm 12 on the suction holder 5 is brought into tight contact with the non-glare glass plate 7 by the suction from below and is aided by the air flow from the nozzles 10a and 10b. This occurs because of the supporting of the microfilm on the metal frame 24 by the spring clips 25.

The surface of the glass plate 7 which the microfilm 12 is in tight contact with is a finely roughened glass surface. The glass plate 7 has the four perforations 8a -8b covering approximately one frame size of the film. As shown in FIG. 2, the protruding portions of the rough surface of the glass plate 7 are in contact with the surface of the flat microfilm surface and the film 12 in uniformly sucked against the glass plate 7, by the suction through the perforations.

The heat provided on the microfilm by the hinge intensity light source 1 is transmitted and dissipated through the glass 7 in contact therewith, and the heat is also dissipated by the air blown from above by the nozzles 10a and 10b. Thus, the film 12 is protected from the heat while images are being projected.

The effect of blowing the film against the glass 7 with the blowing nozzles 10a and 10b provided above the support, while drawing the film against the glass 7 by suction, is that the film is brought into sure contact with the surface of the glass support 7 even if the film is partly separated from the surface of the glass for some reason such as curl of the film or the like. That is, if the film is subjected to downward air flow from the nozzles when curled, the film is moved against the film supporting glass 7 and the whole area of the film is brought into contact with the surface of the glass.

Figure 3:
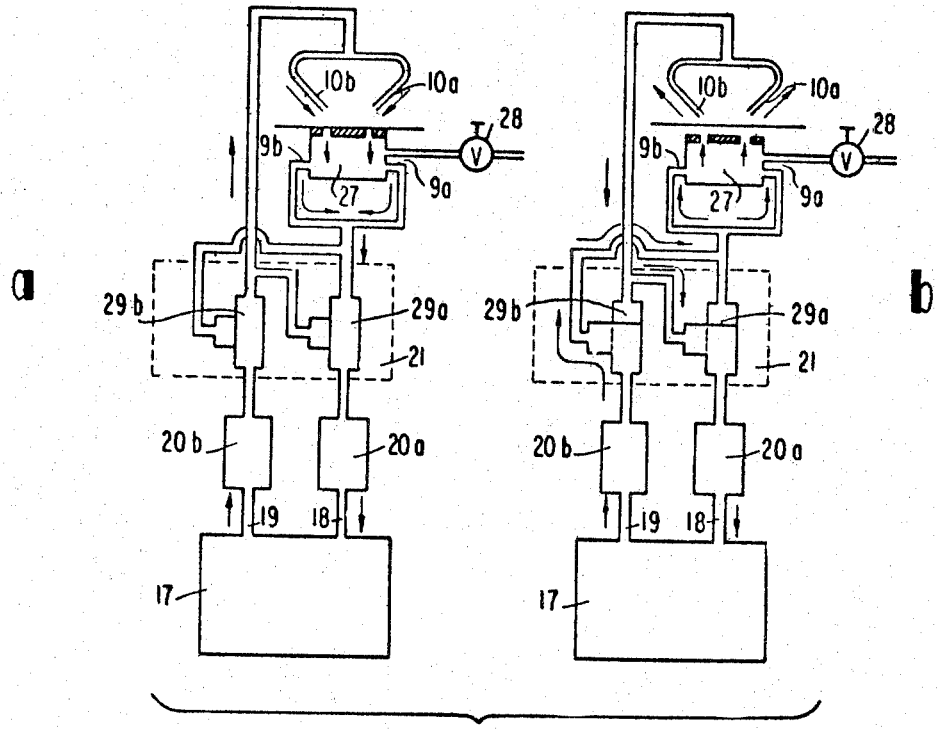
FIGS. 3a and 3b are schematic views showing the air flow system of the present invention and means for controlling the air flow to the suction holder and the blowing nozzles when the film is to be projected and when it is to be moved, respectively.

As best shown in FIGS. 3a and 3b, the air from the suction holder 5 is exhausted through the lines 9a and 9b. Since the exhaust lines 9a and 9b are connected with the upper blowing nozzles 10a and 10b, the film positioning effect is doubled. In other words, when the film is separated from the surface of the film support suction holder 5, the quantity of the exhaust air out of the pipes 9a and 9b increases which results in an increase in the quantity of air blown downward from the nozzles 10a and 10b. Therefore, the further the film is separated from the glass 7, the more strongly the air from the blowing nozzles 10a and 10b is blown downwardly. A leak valve 28 is provided to admit some air into the suction holder chamber 27 of the holder 5 so that a sufficient amount of air is sent to the nozzles 10a and 10b to urge the film into intimate contact with the surface of the glass 7 even when the film is completely in contact with the surface of the glass. It will be understood that the vacuum system need not necessarily be a single system but may be separated into two systems, one of which is for the suction holder 5 and the other of which is for the blowing nozzles 10a and 10b.

As described above, the microfilm is thus kept on the suction holder 5 in close contact with the surface thereof, whereby the image portion of the film is maintained in a flat condition.

Now a mechanism for moving the film 12 after the observation of one frame will be described with reference to FIG. 1. First, a switch 22c on a control box 22 is closed, which causes the shutter 23 to close the optical path, the suction holder 5 provides a blowing of air upwardly through the perforations 8a -8d and the blowing nozzles 10a and 10b serve to draw air therethrough. At this time, the leak valve 28 is closed. This causes the film to float above the suction plate. Approximately 0.1 second after the film is floated by the air cushion above the suction plate, the film is moved laterally. At this time, there is no fear of scratching the surface of the film when the film is moved, since it is not in contact with the glass 7, and the air blowing upwardly through the suction holes has the effect of blowing any dust off on the film. When the desired frame of the image on the film is brought into alignment with the optical axis, the film is stopped. Thus, by reversing the air flow through the suction holes 8a -8d of the suction plate and the nozzles 10a and 10b, the movement or changing of the images on the film can be quickly and easily conducted. This quick changing of the frames by the use of the reversed air suction and blowing is an important advantage and feature of the present invention.

Now the operation of the whole device and the controlling means therefor will be described in detail. The reference numeral 22 is a control box including a main switch 22c, which may be of any suitable construction. By closing the main switch 22c, the light source 1 is turned on and the vacuum pump 17 starts to rotate. Since the distributor 21 is in the condition of film stopping at first, the suction holder 5 operates to suck the film 12 onto the surface of the glass 7 and the rotary switch 30 opens the shutter open and lets the light pass along the optical axis in the device, thereby projecting the image onto the screen 16 with the projection lens system 14.

Then the servo-amplifier (not shown) and the servomotor (not shown) are supplied with driving power. Thus, the entire construction is set in the operating condition. Then, when one frame 13 is desired to be projected onto the screen 16, the keys 22a on the control box 22 are pushed down according to the number of the coordinates of the position of the desired frame. In accordance with the key push, the electrical voltage representing the coordinates of the position of the desired frame of the film is stored or memorized by a memory circuit in the electric circuit in the device. In response to the push of the start button 22b on the control box 22, the rotary solenoid switch 30 is provided with the signal for closing the shutter 23. At the same time, the film 12 is separated from the suction holder glass 7 by the air blowing upwardly through the suction perforations 8a –8d on the holder as was described hereinabove regarding the vacuum system. Thus, the gate of the coordinates signal generating circuit is opened with about 0.1 second delay, and the voltage for imparting the coordinates is applied to the servo-amplifier to drive the servo-motor, whereby the desired frame of the film 12 is brought into the position to be projected onto the screen through the projection optical system. When the servo-motor stops, a signal representing the stop of the motor is transmitted through the control box to the distributor 21 and the solenoid switch 30 is operated to open the shutter with a 0.1 second delay, thereby projecting the image of the desired frame onto the screen 16.

The time taken from pushing down the start button to the projection of the desired image is approximately one second at the longest. By the repetition of the operation as described above, the desired film frames are quickly selected and projected onto the screen 16.

In accordance with the present invention, the film 12 is urged into contact with the surface of the support glass 7 by the combined air suction and blowing action described above. Furthermore, when the film is not in close contact with the film support, the air flow from the blowing nozzles 10a and 10b is automatically increased and urges the film into close contact with the support glass 7.

By the fact that only one frame of the image on the film is brought into alignment with the optical axis of the projection lens system, and owing to the film flatness making portion comprising the suction holder and the blowing nozzles, the necessity of providing a complicated construction for making the whole film flat can be eliminated. Moreover, an optical system having focal depth deep enough for the film to be in the range for focusing sharp images throughout the whole area of the film is not necessitated.

Though the invention has been described with reference to a particular embodiment thereof in which the suction holder is located below the film, it is possible to locate the suction holder above the film and to locate the projection lens system under the film. Such a variation, however, is not as advantageous as the preferred embodiment with respect to the handling of the film and convenience in moving the film in the horizontal plane when selecting the frame in the film. The non-glare glass 7 may be a non-glare plastic plate so long as the plastic has good heat conductivity and transmittivity. It is preferrable to provide a conductive layer on the back surface of the non-glare glass to improve the heat conductivity thereof.

According to out experiment, the roughness of the surface of the non-glare glass 7 of about 1.5mm thickness is desired to be about 100 mesh. If the surface is rougher than this, the roughness affects the flatness of the film itself. The size of the area to be in contact with the film is desired to be about 15mm in diameter. The size of the perforations 8a –8d in the glass 7 is preferably about 2mm in diameter. Four perforations preferably are provided along a circle of 10mm diameter on the glass 7 at equal intervals, which has resulted in good flatness of the film. The dimension of the air tight chamber 27 has been found to preferably be as large as 12mm in diameter and 3mm in height. If it is larger, it requires too much time to completely suck and release the film against and from the glass 7. If it is smaller, it becomes difficult to uniformly suck and release the film through the four perforations. The vacuum pump and the blower are preferred to be combined into the unit 17, for the purpose of effective and economical operation.

Further, in accordance with the present invention, the film 12 can be moved quickly, the dust on the film is easily blown away, and the film is prevented from being scratched when moved. Also, the projection of the image, changing of the frames, and then the projection of a different image can be quickly repeated by the use of reversed suction and blowing of the air through the suction holes on the suction holder in cooperation with the blowing nozzles provided above the suction holder.

The present invention is applicable to not only a microfilm projector of a magnification above 100 times, but also the conventional projection device such as an enlarger printer, slide projector, microreader and the like in which the frames on one film are moved in good flatness. Moreover, this invention is applicable to a camera and contact printer requiring film feeding while taking pictures or printing without scratching of the film.

What is claimed is:

1. Apparatus for projecting images comprising a device for moving a film to and from a position wherein it is projected along an optical axis, said device including a film supporting plate having a plurality of perforations therein, said plate having a finely roughened surface in contact with said film, and being transparent, means for blowing air through said perforations when the film is moved laterally, means for applying suction through said perforations when the film is stopped, valve means connected to said suction and blowing means for selectively applying suction and air pressure to the bottom surface of the film through said perforations and at least one nozzle disposed on the side of the film opposite to the side of said support plate and means for connecting said nozzle to said air blowing means when said suction means is applied to the bottom surface of the film through said perforations to maintain it in position.

2. Apparatus for projecting images as claimed in claim 1 further comprising a projection optical system having an optical path, a shutter for closing the optical path of the projection optical system and means for making the shutter close the optical path when the film is moved out of contact with the surface of said supporting plate.

3. Apparatus for projecting images as claimed in claim 1 wherein said valve means comprise an electromagnetic valve.

4. Apparatus for projecting images as claimed in claim 1 wherein said nozzle is connected to said suction means when said air blowing means operates to blow air through said perforations.

5. Apparatus for projecting images as claimed in claim 4 wherein said nozzle is connected with said suction and air blowing means through said valve means.

6. Apparatus for projecting images as claimed in claim 5 further comprising means for generating a signal for switching said valve means in response to the stopping of the film.

7. Apparatus for projecting images of a film onto a screen through a projection lens system, comprising:
a transparent film support having suction means for holding the film thereon, said support having a finely roughened surface in contact with said film, an air blower disposed on the side of the film opposite to said support for urging the film toward said film support during optical projection, and
means for simultaneously operating said air blower and said suction means.

8. Apparatus for projecting images of a film onto a screen as defined in claim 9 wherein said means for simultaneously operating said blower and suction means comprises a vacuum pump.

9. In a projection device in which film having an image frame is movable from a projecting position in a direction parallel to the plane of the film, the improvement comprising a transparent support plate having a plurality of perforations therethrough and being finely roughened on the surface thereof facing said film, means for applying suction through said perforations to urge the film into close contact with the surface of said support plate, and means for blowing air onto said film from the side of said film opposite that of said support plate to maintain said film in contact with said plate during optical projection of the image carried thereby.

10. A projection device as defined in claim 9 wherein said support plate has an area large enough to support the image frame on said film.

11. A projection device as claimed in claim 10 wherein said area is as large as the size of one frame of the image recorded on said film.

12. A projection device as claimed in claim 9 wherein said transparent support plate is a plastic non-glare plate.

13. A projection device as claimed in claim 9 wherein said transparent support plate is formed of a non-glare glass. 9

14. A projection device as claimed in claim 13 wherein said non-glare glass is provided with more than three perforations.

15. A projection device as claimed in claim 14 wherein said non-glare glass facing said film has a surface roughness of about 100 mesh.

16. A projection device as claimed in claim 14 wherein said non-glare glass is of the size of approximately 15mm in diameter.

17. A projection device as claimed in claim 9 wherein said means for blowing air comprises a nozzle disposed above said supporting plate.

18. A projection device as claimed in claim 17 wherein said nozzle is connected with the discharging outlet of said suction means.

* * * * *